UNITED STATES PATENT OFFICE.

DUNCAN W. PECK, OF SYRACUSE, NEW YORK.

PROCESS OF PRODUCING ARTIFICIAL ASPHALT.

SPECIFICATION forming part of Letters Patent No. 624,082, dated May 2, 1899.

Application filed September 6, 1898. Serial No. 690,310. (No specimens.)

*To all whom it may concern:*

Be it known that I, DUNCAN W. PECK, of Syracuse, in the county of Onondaga and State of New York, have invented new and useful Improvements in Processes of Producing an Artificial Asphalt for Paving and other Purposes and Uses, of which the following is a full, clear, and exact description.

My invention relates to a process for producing artificial asphalt for paving and other purposes and uses.

I am aware that compositions for paving and other purposes have heretofore been patented which use substantially the same ingredients which I use in my composition; but my object is to cheapen the production of the same by an economical process; and to that end my invention consists in mixing and commingling the several ingredients together substantially as hereinafter described, and more specifically set forth in the claim hereunto annexed. In preparing this composition I first take equal parts of coal-tar and common rosin placed in a vessel together with from ten to twenty per cent. of the above ingredients, by weight, of petroleum residuum or other suitable heavy hydrocarbon. The temperature of the mass is then raised under agitation to about 320° Fahrenheit, when from three to five per cent. of sulfur is added and the agitation continued, and the temperature is raised to 350° or 360° Fahrenheit or farther, if desired. Coal-tar pitch may be substituted for coal-tar, in which case the amount would be decreased in accordance to the relative value of the material for this use to coal-tar. The above proportions may be somewhat changed to produce different results, and the final temperature may be raised, if desired. I do not limit myself to the introduction into this mass of petroleum residuum, as it will be evident that any suitable heavy hydrocarbon may be used with the same results.

Having described my invention, what I claim, and desire to secure by Letters Patent, is—

The herein-described process for producing an artificial asphalt, which consists in mixing coal-tar, rosin, and a suitable heavy hydrocarbon together, raising the temperature of the mass while agitating the same, and adding sulfur while the mass is being agitated.

In witness whereof I have hereunto set my hand this 3d day of September, 1898.

DUNCAN W. PECK.

Witnesses:
HOWARD P. DENISON,
M. A. FRANKLIN.